United States Patent
Tsai

(10) Patent No.: US 9,811,094 B2
(45) Date of Patent: Nov. 7, 2017

(54) UNMANNED AERIAL VEHICLE AND FLYING METHOD THEREOF

(71) Applicants: INVENTEC APPLIANCES (PUDONG) CORPORATION, Shanghai (CN); INVENTEC APPLIANCES CORP., New Taipei (TW)

(72) Inventor: Pei-Lun Tsai, New Taipei (TW)

(73) Assignees: Inventec Appliances (Pudong) Corporation, Shanghai (CN); Inventec Appliances Corp, New Taipei (TW)

( * ) Notice: Subject to any disclaimer, the term of this patent is extended or adjusted under 35 U.S.C. 154(b) by 43 days.

(21) Appl. No.: 15/093,250

(22) Filed: Apr. 7, 2016

(65) Prior Publication Data

US 2017/0220046 A1    Aug. 3, 2017

(30) Foreign Application Priority Data

Feb. 3, 2016   (CN) .......................... 2016 1 0075876

(51) Int. Cl.
| | |
|---|---|
| *G01D 1/08* | (2006.01) |
| *B64C 39/02* | (2006.01) |
| *G01W 1/02* | (2006.01) |
| *G05D 1/08* | (2006.01) |
| *G05D 13/00* | (2006.01) |

(52) U.S. Cl.
CPC ......... *G05D 1/0816* (2013.01); *B64C 39/024* (2013.01); *G01W 1/02* (2013.01); *G05D 13/00* (2013.01); *B64C 2201/024* (2013.01); *B64C 2201/08* (2013.01); *B64C 2201/108* (2013.01)

(58) Field of Classification Search
CPC ........ G01D 1/08; G01D 13/00; G01D 1/0816; B64C 39/024; B64C 39/02; G01W 1/02; G05D 13/00
USPC ............................................................ 701/8
See application file for complete search history.

(56) References Cited

U.S. PATENT DOCUMENTS

| | | | |
|---|---|---|---|
| 8,630,755 B2 * | 1/2014 | Ohtomo ................ | B64C 39/024 348/144 |
| 9,448,562 B1 * | 9/2016 | Sirang .................. | G05D 1/0676 |
| 2016/0284221 A1 * | 9/2016 | Hinkle ................. | G08G 5/0034 |

* cited by examiner

*Primary Examiner* — Tan Q Nguyen
(74) *Attorney, Agent, or Firm* — Muncy, Geissler, Olds & Lowe, P.C.

(57) ABSTRACT

An Unmanned Aerial Vehicle (UAV) includes a fuselage, a plurality of rotors, and a sensor, wherein the fuselage includes a control module and a signal processing module, and the control module is connected the arms, which is used to control the rotation of arms. The sensor is configured to the fuselage of the UAV, which is used to detect the rotation change value of the UAV. The signal processing module is connected with the sensor and the control module, which is used to receive and analyze the signal of the sensor, and the control module controls the following flying of the UAV.

20 Claims, 6 Drawing Sheets

UNMANNED AERIAL VEHICLE AND FLYING METHOD THEREOF

FIELD OF THE INVENTION

The present invention relates to an unmanned aerial vehicle and a method for controlling the flight of an unmanned aerial vehicle, particularly relates to an unmanned aerial vehicle which executes to fly by a sensor senses the rotation state of the unmanned aerial vehicle to determine whether the unmanned aerial vehicle reaches to a flight state.

BACKGROUND OF THE INVENTION

Unmanned aerial vehicle is used the earliest for military purpose, such as long-range investigation and spy monitoring. Civil unmanned aerial vehicle has been being developed rapidly for these years and applied mostly to fields such as earth monitoring, disaster prevention and relief, and commercially aerial photography, and so on. Unmanned aerial vehicle is of many advantages, such as high flexibility, lower operation cost compared with traditional aircraft, fewer damages on people because of no passenger on it, and higher safety.

Unmanned aerial vehicle is capable of vertical taking off and landing without takeoff site and runway, so that it may execute tasks of various application fields. Along with different application fields, there are more and more function requirements for unmanned aerial vehicle to be increasingly developed. Present general unmanned aerial vehicle is driven to fly by a throw-up way and driven to automatically fly by detecting whether unmanned aerial vehicle falls down or not. However, it is not intuitive for a user to make unmanned aerial vehicle fly by the throw-up way. Furthermore, if it spends too much time on detecting whether unmanned aerial vehicle falls down or not, unmanned aerial vehicle does not automatically fly possibly to further cause failure in flying. The situations aforementioned are necessarily improved.

SUMMARY OF THE INVENTION

For resolving drawbacks aforementioned, the present invention provides an unmanned aerial vehicle and a method for controlling the flight of an unmanned aerial vehicle. The unmanned aerial vehicle of the present invention is intuitively and conveniently used because it may fly just by rotating the unmanned aerial vehicle, such as throwing the unmanned aerial vehicle like a Frisbee throwing. The unmanned aerial vehicle includes a fuselage, a plurality of rotors and a sensor. The fuselage includes a controlling module and a signal processing module. The rotors are connected to the fuselage and to the controlling module, respectively. The controlling module is configured to control the rotors. The sensor is arranged onto the unmanned aerial vehicle and configured to detect the rotation variation value of the unmanned aerial vehicle. The signal processing module is electrically coupled to the sensor and the controlling module and configured to receive and analyze the rotation variation value detected by the sensor. Then the controlling module controls the unmanned aerial vehicle to execute sequential flight. The unmanned aerial vehicle of the present invention further includes at least one gyroscope which is connected to the signal processing module and configured to detect an offset angle between the unmanned aerial vehicle and a horizontal plane. According to the offset angle, the controlling module adjusts the flight attitude of the unmanned aerial vehicle and makes it in a stable flight state.

The present provides a method for controlling the flight of an unmanned aerial vehicle, which includes the steps as follows: driving the unmanned aerial vehicle and setting the unmanned aerial vehicle in a non-flying state; rotating the unmanned aerial vehicle; acquiring the rotation variation value of the unmanned aerial vehicle after the unmanned aerial vehicle is rotated; and comparing the rotation variation value with a presetting value to determine whether the unmanned aerial vehicle executes flight or not. The unmanned aerial vehicle will execute flight if it is yes; otherwise, the unmanned aerial vehicle is held in the non-flying state.

According to the method for controlling the flight of an unmanned aerial vehicle of the present invention, the unmanned aerial vehicle may fly just by rotating the unmanned aerial vehicle, such as throwing the unmanned aerial vehicle like a Frisbee throwing, which is intuitively and conveniently used by a user to operate the unmanned aerial vehicle.

DETAILED DESCRIPTION OF THE PREFERRED EMBODIMENT

Figure 1:
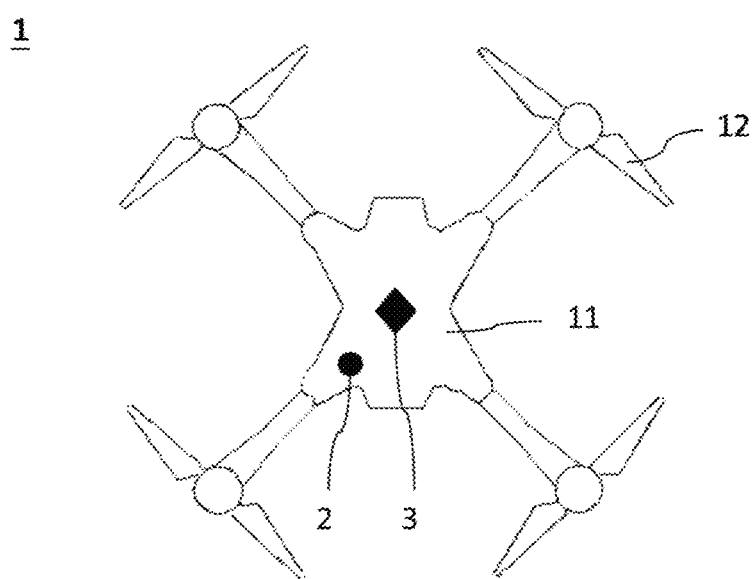
FIG. 1 is a schematic plan-view diagram illustrating an unmanned aerial vehicle according to the present invention.
Figure 2:
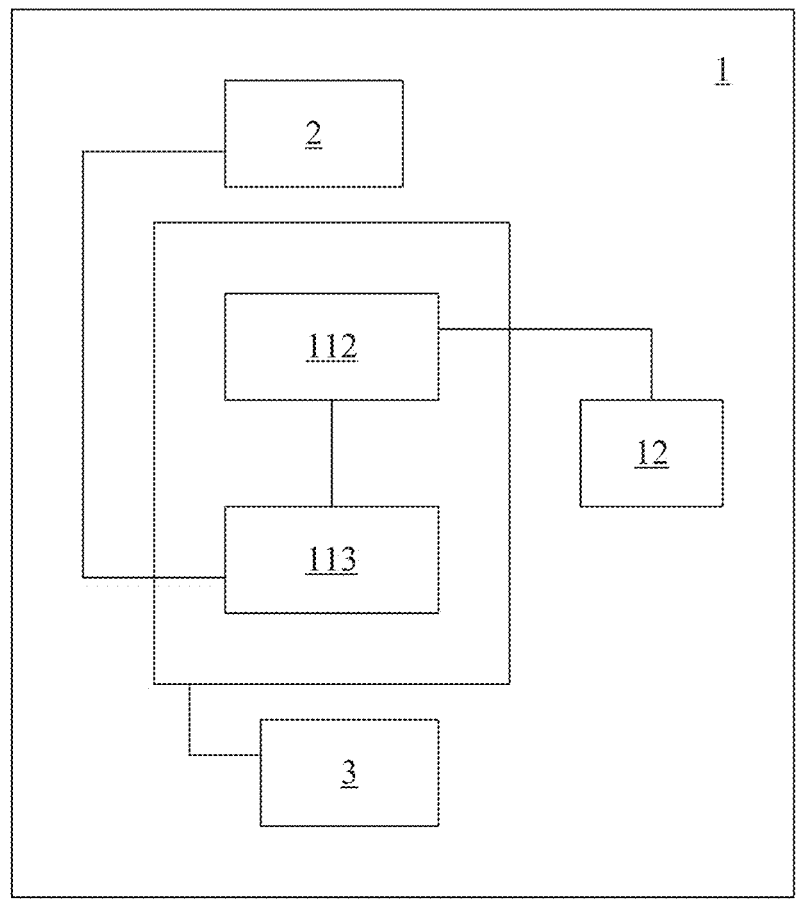
FIG. 2 is a schematic block diagram illustrating an unmanned aerial vehicle according to the present invention.

FIG. 1 is a schematic plan-view diagram illustrating an unmanned aerial vehicle according to the present invention. FIG. 2 is a schematic block diagram illustrating an unmanned aerial vehicle according to the present invention. Referring to FIG. 1 and FIG. 2, an unmanned aerial vehicle 1 includes a fuselage 11, a plurality of rotors 12 and a sensor 2. The fuselage 11 includes a controlling module 112 and a signal processing module 113. The rotors 12 are coupled to the fuselage 11 and connected to the controlling module 112. The controlling module 112 is configured to control the rotors 12. The sensor 2 is arranged on the fuselage 11 of the unmanned aerial vehicle 1 and configured to detect the rotation variation value of the unmanned aerial vehicle 1. The signal processing module 113 is electrically connected to the sensor 2 and the controlling module 112, and configured to receive and analyze the rotation variation value that is detected by the sensor 2. The controlling module 112 then controls the flight of the unmanned aerial vehicle 1. The signal processing module 113 may be integrated into the controlling module 112. Besides, the controlling module 112, the signal processing module 113 and the sensor 2 may be arranged on any position of the unmanned aerial vehicle 1. The unmanned aerial vehicle 1 of the present invention further includes a gyroscope 3 electrically connected to the signal processing module 113 and configured to detect an offset angle between the unmanned aerial vehicle 1 and a horizontal plane. The signal processing module 113 receives and analyzes the offset angle detected by the gyroscope 3, and then the controlling module 112 controls the flight attitude of the unmanned aerial vehicle 1 according to the offset angle. For example, make the unmanned aerial vehicle 1 be in parallel with the horizontal plane and fly horizontally. Besides, the flight attitude of the unmanned aerial vehicle 1 may be not limited to the horizontal ones and may be any one depending to real situations.

Figure 3:
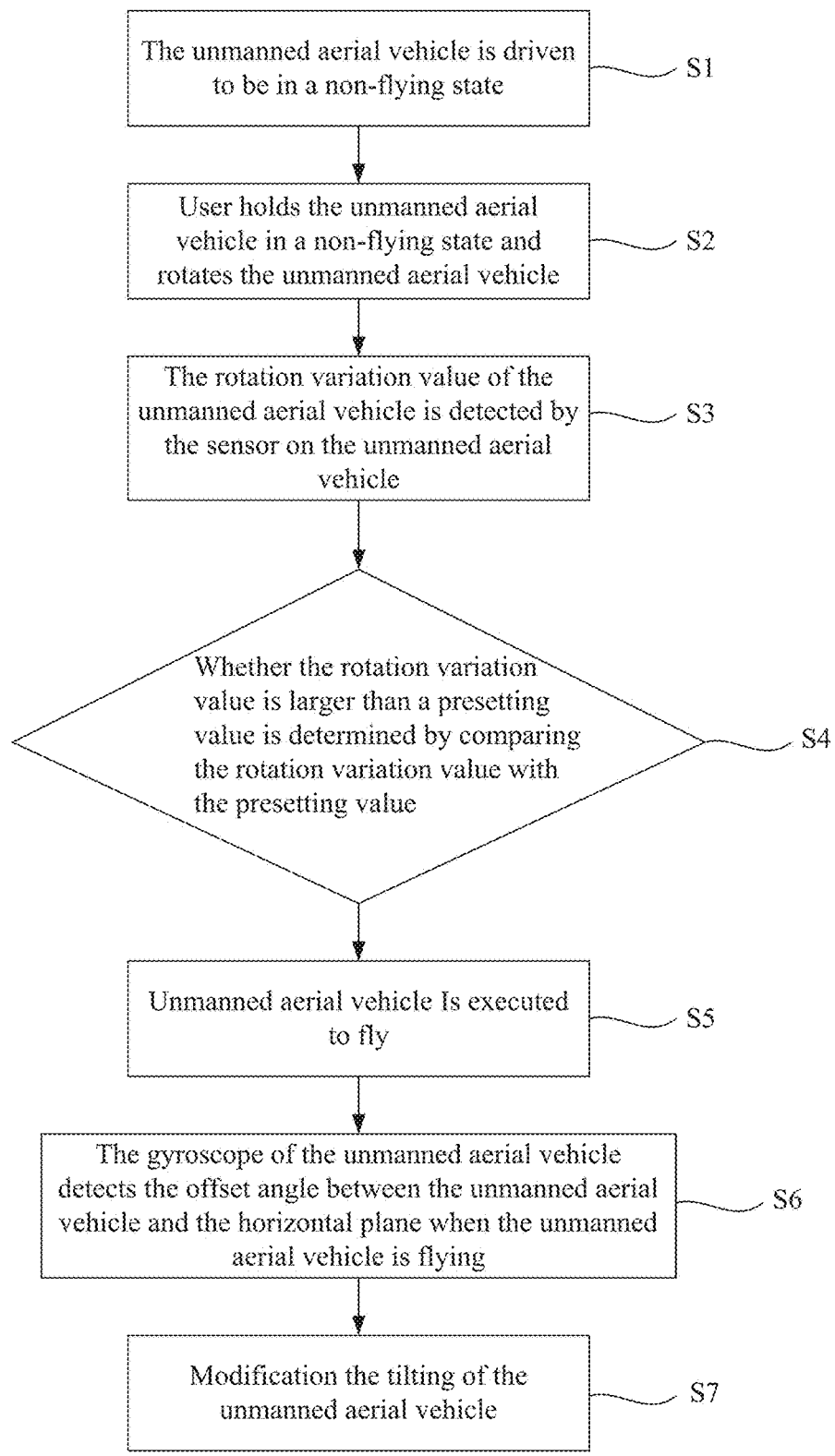
FIG. 3 is a schematic diagram illustrating the flight flowchart of an unmanned aerial vehicle according to the present invention.

Next, FIG. 3 is a schematic diagram illustrating the flight flowchart of an unmanned aerial vehicle according to the present invention. First, step S1: the unmanned aerial vehicle is driven to be in a non-flying state, such as rotors stop or the rotors in a slow rotation. Alternatively, the step S1 can be omitted and the unmanned aerial vehicle can be driven by subsequent steps. Next, step S2: a user holds the unmanned aerial vehicle in a non-flying state and rotates the unmanned aerial vehicle, such as throws the unmanned aerial vehicle like a Frisbee throwing. Next, Step S3: the rotating variation value of the unmanned aerial vehicle is detected by the sensor on the unmanned aerial vehicle.

Next, step S4: whether the rotation variation value is larger than a presetting value is determined by comparing the rotation variation value with the presetting value, and a default situation is the rotation variation value larger than the presetting value, but not limit to. Step S5 will be executed provided that the rotation variation value is larger than the presetting value in step S4; otherwise the process will go back to step Si to maintain the unmanned aerial vehicle in the non-flying state provided that the rotation variation value is smaller than the presetting value. It is noted that the larger the presetting value of the unmanned aerial vehicle is, the less sensitive the unmanned aerial vehicle is. Oppositely, the smaller the presetting value of the unmanned aerial vehicle is, the more sensitive the unmanned aerial vehicle is. That is, in the case that the unmanned aerial vehicle is with a smaller presetting value, that the unmanned aerial vehicle launches to fly after detection of the sensor is subject to the user's rotation signature or user's lightly rotating the unmanned aerial vehicle on ground, because the rotation variation value can be easily over the smaller presetting value. But in fact the user is not ready to launch the unmanned aerial vehicle to fly. Thus, the presetting value should be carefully determined for avoiding that the user's mal-operation. In the embodiment, the presetting value can be determined depending on the user's requirement, or directly adjusted by the user. The presetting value is not limited to in the present invention.

Figure 6:
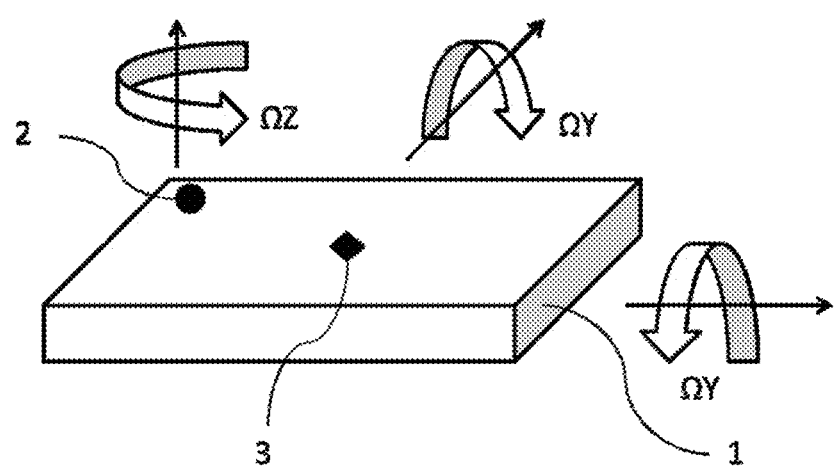
FIG. 6 is a schematic diagram illustrating the detection of the offset angle of the unmanned aerial vehicle according to the present invention.

Next, FIG. 6 is a schematic diagram illustrating the detection of the offset angle of the unmanned aerial vehicle according to the present invention. Please refer to FIG. 3 and FIG. 6, step S6 will go through after the unmanned aerial vehicle launches to fly. In step S6, the gyroscope 3 of the unmanned aerial vehicle (shown in FIG. 1) detects the offset angle between the unmanned aerial vehicle and the horizontal plane when the unmanned aerial vehicle is flying. The turning around of the offset angle is consisted of three angle velocities $\Omega X$, $\Omega Y$ and $\Omega Z$, shown in FIG. 6. In step S6, the gyroscope is a common element for detecting an angle of an object movement. At the beginning of the unmanned aerial vehicle flying, the unmanned aerial vehicle flies with the offset angle rather than in parallel with the horizontal plane. For the purpose of making the unmanned aerial vehicle fly in parallel with the horizontal plane, the unmanned aerial vehicle is equipped with the gyroscope to detect the offset angle between the unmanned aerial vehicle and the horizontal plane. The principle of the gyroscope is to convert an angular velocity into a displacement of a specific sensing component according to Coriolis force because Coriolis force makes the specific sensing component generate the displacement. The larger the angular velocity is, the more the displacement is. Coriolis force acceleration velocity may be combined with a vibration velocity of the specific sensing component and demodulated synchronously so as to get a rotational angular velocity and further get an angle of an object movement. Thus, if the unmanned aerial vehicle flies at an offset angle to a horizontal plane, the offset angle can be detected by the gyroscope 3. Finally, go to step S7 to modify the tilting of the unmanned aerial vehicle. The offset angle between the unmanned aerial vehicle and the horizontal plane are adjusted to make the unmanned aerial vehicle be parallel to the horizontal plane and fly in a horizon way in air. Besides, the flight way of the unmanned aerial vehicle is not limited to the horizon ones.

Figure 4:
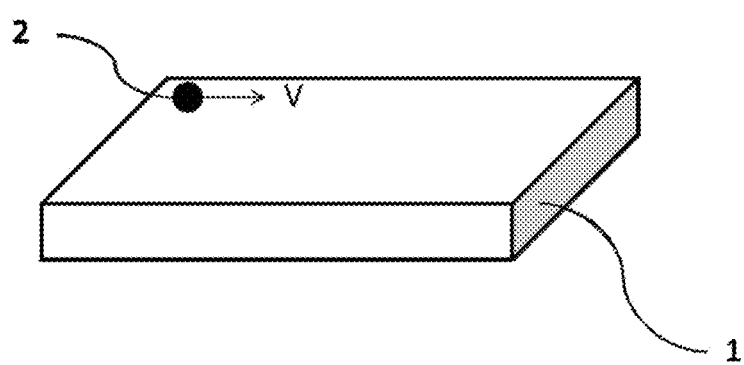
FIG. 4 is a schematic diagram illustrating a detection direction of an acceleration velocity of an unmanned aerial vehicle according to the present invention.
Figure 5:
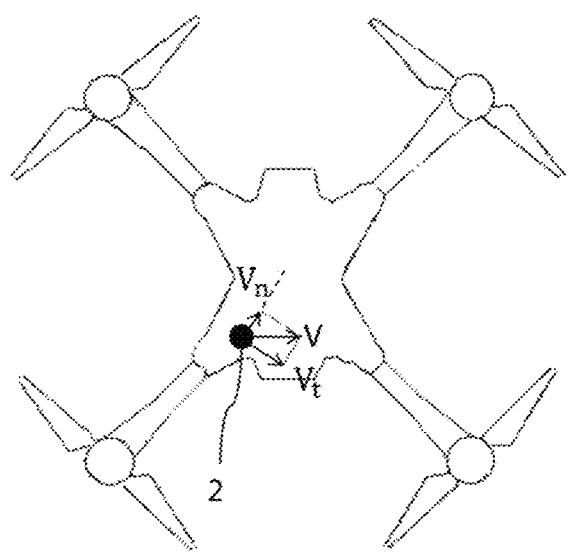
FIG. 5 is a schematic diagram illustrating an acceleration velocity in a radial direction of an unmanned aerial vehicle according to the present invention.

In the embodiment, the sensor 2 may be an acceleration detector for detecting an acceleration value after the unmanned aerial vehicle rotates. FIG. 4 is a schematic diagram illustrating a detection direction of an acceleration velocity of an unmanned aerial vehicle according to the present invention. Shown in FIG. 4, in the embodiment, the sensor 2 only detects the acceleration velocity of single direction, and may be a linear acceleration detector. The linear acceleration detector may be arranged on any position of the unmanned aerial vehicle 1, and the number of the linear acceleration detectors may be dependent on requirements. The vector of direction V is the direction of the acceleration velocity detected by the linear acceleration detector. The linear acceleration detector detects the acceleration velocity in direction V after the unmanned aerial vehicle rotates. In one embodiment of the present invention, the rotation variation value after the unmanned aerial vehicle rotates can be directly calculated from the acceleration velocity detected by the linear acceleration detector. In the case that the unmanned aerial vehicle 1 is equipped with a plurality of the linear acceleration detectors, a plurality of the acceleration velocities measured by the a plurality of the linear acceleration detectors may be summed to determine a total value that is the rotation variation value after the unmanned aerial vehicle 1 rotates. In another embodiment, once the linear acceleration detector detects the acceleration velocity of the unmanned aerial vehicle 1 after the unmanned aerial vehicle 1 rotates, the signal processing module 113 of the unmanned aerial vehicle 1 may acquire the component value of the acceleration velocity value in a radial direction that is a centripetal acceleration value. FIG. 5 is a schematic diagram illustrating an acceleration velocity in a radial direction of an unmanned aerial vehicle according to the present invention. Shown in FIG. 5, the vector in direction V is an acceleration direction detected by a linear acceleration detector. The signal processing module 113 divides the acceleration direction into two component values in two directions: one is the radial direction $V_n$ and the tangential direction $V_t$. The component value of the acceleration velocity value in the radial direction is the centripetal acceleration value. In the case that a plurality of linear acceleration detectors are deposited on the unmanned aerial vehicle 1, a plurality of component values in corresponding radial directions are calculated from acceleration velocities detected by the linear acceleration detectors and acquired centripetal acceleration values are summed to become a rotation variation value of the unmanned aerial vehicle 1 after rotation. Furthermore, provided that whole acceleration velocities are considered, the more the acceleration detectors 2 are deposited, the more precise the acceleration velocities are. Consequently, the accuracy whether the unmanned aerial vehicle 1 flies or not may be more precisely determined. In the embodiment, the number of the acceleration detectors 2 may be used to meet user's requirement, and it is not limited in the present invention.

In the embodiment, in step S3, a linear acceleration detector equipped on the unmanned aerial vehicle detects an acceleration value after the unmanned aerial vehicle rotates. Next, step S4: the detected acceleration value after the unmanned aerial vehicle rotates is compared with the presetting value to determine whether the detected acceleration value is larger than the presetting value. In step S4, step S5 will go through to make the unmanned aerial vehicle fly provided that the detected acceleration value is larger than the presetting value; otherwise the process will go back to step S1 to maintain the unmanned aerial vehicle in a non-flying state provided that the detected acceleration value is smaller than the presetting value.

In another embodiment, in step S3, a linear acceleration detector equipped on the unmanned aerial vehicle detects an acceleration value after the unmanned aerial vehicle rotates. Then a component value in a radial direction of the acceleration value is further acquired and is a centripetal acceleration value. Next, step S4: the detected centripetal acceleration value after the unmanned aerial vehicle rotates is compared with the presetting value to determine whether the detected centripetal acceleration value is larger than the presetting value. In step S4, step S5 will go through to make the unmanned aerial vehicle fly provided that the detected centripetal acceleration value is larger than the presetting value; otherwise the process will go back to step Si to maintain the unmanned aerial vehicle in a non-flying state provided that the detected centripetal acceleration value is smaller than the presetting value.

In another embodiment, the sensor 2 may be a wind detector that is capable of detecting a wind value after the unmanned aerial vehicle rotates. For example, a hot-wire anemometer detects the wind value after the unmanned aerial vehicle rotates. The hot-wire anemometer includes a sensor component (a thin metal silk heated by passing electric current) putted in a channel Gaseous fluid passes through the sensor component and takes out heat away from the sensor component. The faster the velocity of the gaseous fluid is, the lower the temperature of the sensor component is. Consequently, the value of the velocity is acquired by measuring the temperature of the thin metal silk. Alternatively, the temperature of the thin metal silk may be kept to be fixed by adjusting the heating electric current. The faster the velocity of the gaseous fluid is, the more the heating electric current is. Consequently, the value of the velocity is acquired by measuring the amount of the heating electric current.

In the embodiment, in step S3, a wind detector equipped on the unmanned aerial vehicle detects a wind speed value after the unmanned aerial vehicle rotates. Next, step S4: the detected wind speed value after the unmanned aerial vehicle rotates is compared with the presetting value to determine whether the detected wind speed value is larger than the presetting value. The detected wind speed value may be analyzed to be a tangential velocity value. In step S4, step S5 will go through to make the unmanned aerial vehicle fly provided that the detected wind speed value is larger than the presetting value; otherwise the process will go back to step S1 to maintain the unmanned aerial vehicle in a non-flying state provided that the detected wind speed value is smaller than the presetting value.

In another embodiment, the sensor 2 may be a wind pressure detector to detect a wind pressure value after the unmanned aerial vehicle rotates. For example, a capacitive pressure micro sensor or a piezo-resistive pressure micro sensor may be used to detect the wind pressure value after the unmanned aerial vehicle rotates. A general pressure sensor can be divided into a piezo-resistive type or a capacitive type. The resistance value of a piezo-resistive type sensor can change along with a material under a stress force, and a voltage on the resistor of the piezo-resistive type sensor can also change to indicate a pressure value. A capacitive type sensor includes a capacitor consisting of a measurement metal plate and a fixed metal plate. Once the measurement metal plate has a deformation resulted from a pressure, the capacitance between the measurement metal plate and the fixed metal plate can change, too. Thus, the changed capacitance can be used to calculate a pressure value.

Step S3: a wind pressure detector equipped on the unmanned aerial vehicle is used to detect the wind pressure value of the unmanned aerial vehicle after a rotation. Next, step S4: the detected wind pressure value of the unmanned aerial vehicle after the rotation is compared with the presetting value to determine whether the detected wind pressure value is larger than the presetting value. The detected wind pressure value may be analyzed to be a tangential velocity value. In step S4, step S5 will go through to make the unmanned aerial vehicle fly provided that the detected wind pressure is larger than the presetting value; otherwise the process will go back to step S1 to maintain the unmanned aerial vehicle in a non-flying state provided that the detected wind pressure is smaller than the presetting value.

Accordingly, the unmanned aerial vehicle and the method thereof of the present invention utilize the sensor 2 to detect the rotation variation value of the unmanned aerial vehicle 1 after the unmanned aerial vehicle 1 launches to fly and determine whether the unmanned aerial vehicle 1 satisfies flight conditions or not. If the unmanned aerial vehicle 1 satisfies the flight conditions, the unmanned aerial vehicle 1 launches to fly, and the equipped gyroscope 3 that detects the offset angle can determine within a short period whether the unmanned aerial vehicle 1 is able to continuously fly after the rotation of the unmanned aerial vehicle 1. Moreover, the equipped gyroscope 3 can make the unmanned aerial vehicle 1 stably fly in a blink after the flying of the unmanned aerial vehicle 1.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An unmanned aerial vehicle, comprising:
   a fuselage;
   a plurality of rotors connected to the fuselage;
   at least a sensor provided to be arranged on the unmanned aerial vehicle and configured to detect a rotation variation value of the unmanned aerial vehicle;
   a signal processing module electrically coupled to the sensor and a controlling module respectively, and configured to receive and analyze the rotation variation value of the unmannaed aerial vehicle which is detected by the sensor; and the controlling module connected to the plurality of rotors and configured to control the flight of the unmanned aerial vehicle according to a result which is analyzed by the signal processing module.

2. The unmanned aerial vehicle according to claim 1, wherein the signal processing module is configured to compare the rotation variation value of the unmanned aerial vehicle with a presetting value.

3. The unmanned aerial vehicle according to claim 1, further comprising a gyroscope connected to the signal processing module.

4. The unmanned aerial vehicle according to claim 3, wherein the gyroscope is configured to detetect an offset angle between the unmanned aerial vehicle and a horizontal plane.

5. The unmanned aerial vehicle according to claim 4, wherein the controlling module is further configured to control a flight attitude of the unmanned aerial vehicle according to the offset angle.

6. The unmanned aerial vehicle according to claim 1, wherein the sensor is selected from the group consisting of a linear acceleration detector, a wind detector and a wind pressure detector.

7. The unmanned aerial vehicle according to claim 6, wherein the signal processing module further analyzing a tangential velocity value of the rotation variation value.

8. The unmanned aerial vehicle according to claim 6, wherein the signal processing module further analyzing a centripetal acceleration value of the rotation variation value.

9. A method for controlling the flight of an unmanned aerial vehicle, comprising:

performing the unmanned aerial vehicle set in a rotation motion;

acquiring a rotation variation value of the unmannaed aerial vehicle in the rotation motion; and comparing the rotation variation value of the unmanned aerial vehicle and a presetting value, and controlling the unmanned aerial vehicle for flying if the rotation variation value of the unmanned aerial vehicle reaches the presetting value.

10. The method according to claim 9, wherein the unmanned aerial vehicle comprises at least a sensor and the sensor is configured to detect the rotation variation value of the unmanned aerial vehicle.

11. The method according to claim 10, wherein the sensor is selected from the group consisting of a linear acceleration detector, a wind detector and a wind pressure detector.

12. The method according to claim 9, wherein the rotation variation value of the unmanned aerial vehicle is a linear acceleration value.

13. The method according to claim 12, wherein the linear acceleration value is further analyzed to be a centripetal acceleration value.

14. The method according to claim 9, wherein the rotation variation value of the unmanned aerial vehicle is a wind speed value or a wind pressure value.

15. The method according to claim 14, wherein the wind speed value and the wind pressure value are further analyzed to be a tangential velocity value.

16. The method according to claim 9, wherein the rotation variation value of the unmanned aerial vehicle is a total value of the rotation variation values of the plurality of rotors.

17. The method according to claim 16, wherein the total value is compared with the presetting value.

18. The method according to claim 9, wherein the presetting value is modified in accordance with the requirement of users.

19. The method according to claim 9, further comprising detecting an offset angle between the unmanned aerial vehicle and a horizontal plane when the unmanned aerial vehicle is flying.

20. The method according to claim 19, further comprising controlling a flight attitude of the unmanned aerial vehicle in accordance with the offset angle.

* * * * *